(12) United States Patent
Park et al.

(10) Patent No.: US 9,458,788 B2
(45) Date of Patent: Oct. 4, 2016

(54) INJECTOR DRIVER AND METHOD OF CONTROLLING THE SAME

(71) Applicants: Hyundai Motor Company, Seoul (KR); Kia Motors Corporation, Seoul (KR); Hyundai Autron Company Ltd., Seongnam, Gyeonggi-Do (KR)

(72) Inventors: Choong Seob Park, Gyeonggi-do (KR); Ji Haeng Lee, Gyeonggi-do (KR); Kang Hee Cho, Gyeonggi-do (KR); Doo Jin Jang, Seoul (KR)

(73) Assignees: Hyundai Motor Company, Seoul (KR); Kia Motors Corporation, Seoul (KR); Hyundai Autron Company, Ltd., Seongnam, Gyeonggi-do (KR)

(*) Notice: Subject to any disclaimer, the term of this patent is extended or adjusted under 35 U.S.C. 154(b) by 330 days.

(21) Appl. No.: 14/198,953

(22) Filed: Mar. 6, 2014

(65) Prior Publication Data

US 2015/0176517 A1 Jun. 25, 2015

(30) Foreign Application Priority Data

Dec. 19, 2013 (KR) .................. 10-2013-0159191

(51) Int. Cl.
| | |
|---|---|
| F02D 41/20 | (2006.01) |
| F02D 41/22 | (2006.01) |
| F02D 41/30 | (2006.01) |
| F02M 21/02 | (2006.01) |
| F02D 19/06 | (2006.01) |

(52) U.S. Cl.
CPC ....... *F02D 41/3005* (2013.01); *F02D 19/0623* (2013.01); *F02D 41/20* (2013.01); *F02D 41/22* (2013.01); *F02D 41/221* (2013.01); *F02M 21/0293* (2013.01); *F02D 2041/2093* (2013.01); *F02D 2041/224* (2013.01); *F02D 2041/226* (2013.01); *Y02T 10/40* (2013.01)

(58) Field of Classification Search
CPC .... F02D 19/0623; F02D 41/20; F02D 41/22; F02D 41/221; F02D 41/222; F02D 2041/224; F02D 2041/226; F02M 21/0293
USPC ........ 123/479, 478; 701/103, 107, 114, 115; 73/114.45; 361/18
See application file for complete search history.

(56) References Cited

U.S. PATENT DOCUMENTS

| | | | |
|---|---|---|---|
| 3,919,885 A | * | 11/1975 | Kaireit .................. F02D 41/22 73/114.45 |
| 8,161,946 B2 | | 4/2012 | Pursifull |
| 2004/0003801 A1 | | 1/2004 | Linna et al. |
| 2009/0158833 A1 | | 6/2009 | Kusatsugu |
| 2011/0134573 A1 | | 6/2011 | Haller |

FOREIGN PATENT DOCUMENTS

| | | |
|---|---|---|
| JP | 4503595 B2 | 7/2010 |
| KR | 10-2011-0039570 A | 4/2011 |
| KR | 10-2013-0069126 | 6/2013 |

* cited by examiner

*Primary Examiner* — Mahmoud Gimie
(74) *Attorney, Agent, or Firm* — Mintz Levin Cohn Ferris Glovsky and Popeo, P.C.; Peter F. Corless

(57) ABSTRACT

An injector driver and a method of controlling the injector driver are provided. A defect of a driving channel is detected by enabling an identification of safety inspection for each channel in a driving semiconductor during an idle mode. The injector driver includes a plurality of driving switches that operate an injector and a driving semiconductor that drives of the driving switches. In addition, the driving semiconductor determines a short defect of the injector during an idle mode and detects and stores the defective short in a channel unit.

15 Claims, 8 Drawing Sheets

INJECTOR DRIVER AND METHOD OF CONTROLLING THE SAME

CROSS-REFERENCE TO RELATED APPLICATION

This application is based on and claims priority from Korean Patent Application No. 10-2013-0159191, filed on Dec. 19, 2013 in the Korean Intellectual Property Office, the disclosure of which is incorporated herein in its entirety by reference.

BACKGROUND

1. Field of the Invention

The present invention relates to an injector driver, and more particularly, to a technology that actively identifies a defect of a driving channel by enabling an identification of safety inspection for each channel in a driving semiconductor during an idle mode.

2. Description of the Prior Art

In recently developed vehicles, when fuel is supplied to an engine, the vehicle engine receives data from various sensors. Further, an electronic control unit (ECU) determines a supply amount of fuel based on the data and an injector, which injects fuel, supplies the determined fuel amount. The vehicle engine system is mounted with a fuel injector that supplies and injects fuel, in particular, a diesel engine vehicle is mounted with an injector to directly inject fuel into a combustion chamber. As an example of the fuel injection device, a common rail system supplies fuel from a high pressure pump to a rail. Further, the electronic control unit (ECU) receives pressure from the rail via a pressure sensor to adjust the pressure from the rail and transmits a fuel injection signal to inject the fuel.

In the common rail system, a center of an engine block includes an accelerometer and each signal generated from the accelerometer is stored to regulate a pilot fuel amount to meet an injector state. Even though the same injector repeatedly injects a substantially small injection amount several times, the injector should perform an original function to manage the injection amount within a predetermined deviation. Therefore, the management of a fuel amount of a pilot injection or a post injection is an integral factor.

However, in the existing injection driver, inspection in a channel unit that corresponds to a power supply and reference potential short may not be performed during an idle mode. In other words, the injector driver according to the related art may only detect defect locations in a bank unit when a short circuit occurs between a connection channel of a power supply voltage terminal and the injector and a connection channel of a reference voltage terminal and the injector.

A main micro control unit (MCU) enters a driving mode to detect the defect locations when the defect of the corresponding bank occurs during the idle mode state. In particular, the main micro control unit may program a specific sequence and then identify the defect locations to identify at which location the defect occurs. Therefore, substantial delays occur to recognize the defective state of the bank and to detect the locations at which the defect occurs.

SUMMARY

The present invention provides an injector driver that actively identifies a defect of a driving channel by identifying a safety inspection for each driving channel in a driving semiconductor during an idle mode. Further, the present invention provides an injector driver that identifies defects by identifying defects for each driving channel in a driving semiconductor and transfers a result of safety inspection to a main micro control unit (MCU).

In one aspect of the present invention, an injector driver may include: driving switches configured to operate an injector; and a driving semiconductor configured to drive the driving switches, determine a short defect of the injector during an idle mode, and detect and store the defective short in a channel unit.

In another aspect of the present invention, an injector driver may include: driving switches configured to operate an injector; a monitoring unit configured to drive the driving switches, determine a short defect of the injector during an idle mode, and detect the defective short in a channel unit; a register configured to store an output of the monitoring unit; and a controller configured to read information stored in the register and determine a short defect location of the injector.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
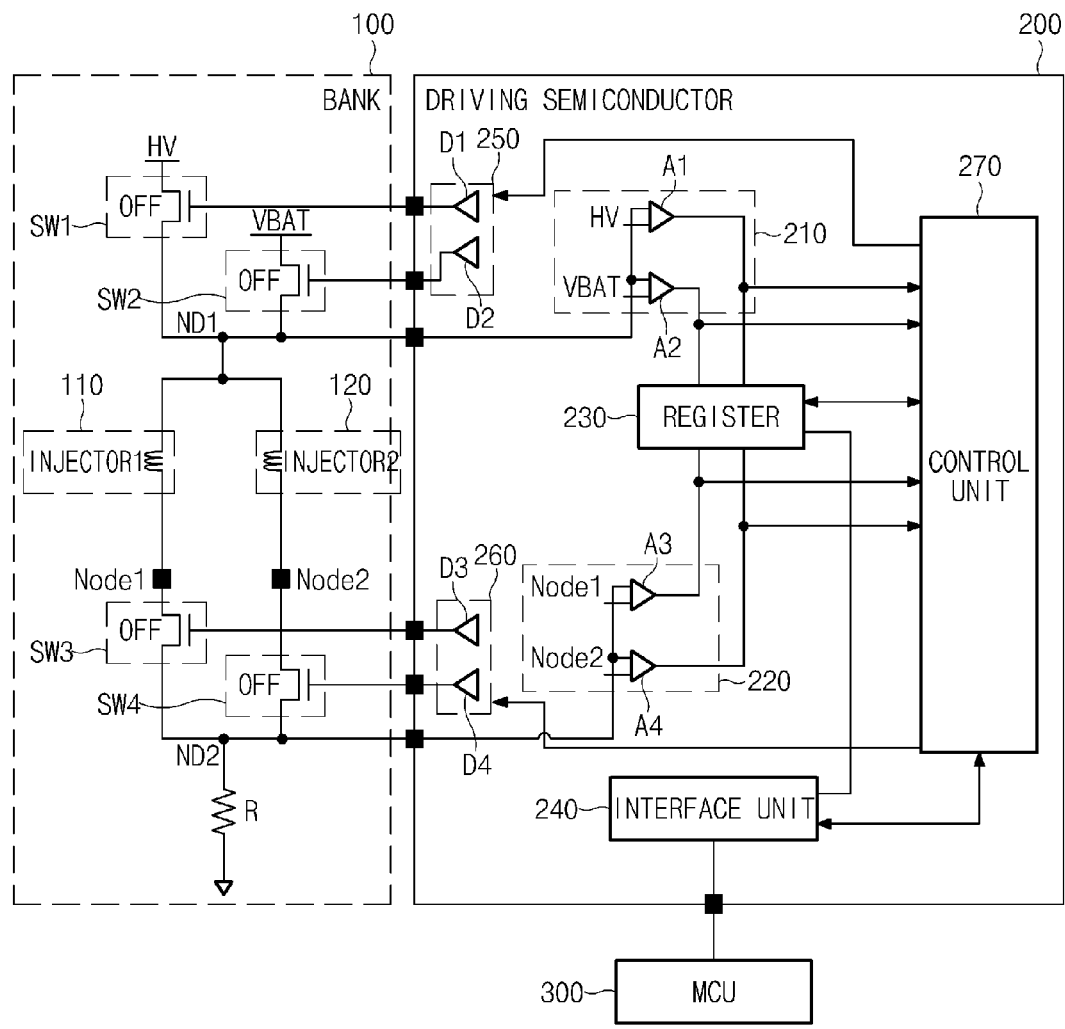
FIG. 1 is an exemplary configuration diagram of an injector driver according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings. FIG. 1 is an exemplary configuration diagram of an injector driver according to an exemplary embodiment of the present invention. According to an exemplary embodiment of the present invention, the injector driver may include a bank 100, a driving semiconductor 200, and a micro control unit (MCU) 300.

The bank 100 may include at least two injectors 110 and 120, a plurality of driving switches SW1 to SW4, and a resistor R. The exemplary embodiment of the present invention describes an example in which the two injectors 110 and 120 are included in the bank 100 but is not limited thereto, and therefore the number of injectors may be sufficiently changed. Further, a switching state of the plurality of driving switches SW1 to SW4 may be operated based on driving units 250 and 260 of the driving semiconductor 200. The plurality of driving switches SW1 to SW4 may remain in an off state during an idle mode state.

Moreover, the driving switch SW1 may be a driving switch configured to supply a substantially high voltage HV to the injectors 110 and 120. The driving switch SW1 may include a metal-oxide-semiconductor field-effective (MOS) transistor connected between the high voltage HV applying terminal and a node ND1 to apply an output of a driver D1 via a gate terminal Further, the driving switch SW2 may be a driving switch configured to supply a power supply voltage VBAT applied from a battery to the injectors 110 and 120. The driving switch SW2 may include an MOS transistor connected between the power supply voltage VBAT applying terminal and a node ND1 to apply an output of a driver D2 via a gate terminal. The driving switches SW3 and SW4 may be driving switches configured to supply a reference voltage, that is, a ground (GND) voltage to the injectors 110 and 120.

The driving switch SW3 may include an MOS transistor connected between a node Node1 and a node ND2 to apply an output of a driver D3 via a gate terminal. Further, the driving switch SW4 may include an MOS transistor connected between a node Node2 and the node ND2 to apply an output of a driver D4 via a gate terminal. The resistor R may be connected between the node ND2 and a ground (GND) voltage applying terminal. The driving semiconductor 200 may include a first monitoring unit 210, a second monitoring unit 220, a register 230, an interface unit 240, the driving units 250 and 260, and a controller 270.

In this configuration, the first monitoring unit 210 may be configured to monitor a state of a connection channel between the driving switches SW1 and SW2 which supply the substantially high voltage HV (e.g., a predetermined voltage) or the power supply voltage VBAT to the injectors 110 and 120. The second monitoring unit 220 may be configured to monitor the state of the connection channel between the driving switches SW3 and SW4 which supply the reference voltage to the injectors 110 and 120.

The first monitoring unit 210 may include comparators A1 and A2 configured to compare node signals of each of both terminals of the driving switches SW1 and SW2 at the power supply voltage side. In other words, the comparator A1 may be configured to compare the high voltage HV with the output of the node ND1 and output the compared result to the register 230. Further, the comparator A2 may be configured to compare the power supply voltage VBAT with the output of the node ND1 and output the compared result to the register 230. The second monitoring unit 220 may include comparators A3 and A4 configured to compare the node signals of both terminals of each of the driving switches SW3 and SW4 at the reference voltage side. In other words, the comparator A3 may be configured to compare the output of the node Node1 with the output of the node ND2 applied with the ground GND voltage and output the compared result to the register 230. The comparator A4 may be configured to compare the output of the node Node2 with the output of the node ND2 applied with the ground GND voltage and output the compared result to the register 230.

The register 230 may be configured to store the defect detection results in the channel unit applied from the first monitoring unit 210 and the second monitoring unit 220. Further, the register 230 may be configured to transfer the defect detection results stored in the channel unit to the interface unit 240. In other words, the register 230 may be configured to store and update information regarding the defective bank, information regarding whether a short defect occurs at the power supply voltage side or a short defect occurs at the reference voltage side, information regarding whether a short defect occurs at an upper portion of the injector or a short defect occurs at a lower portion of the injector, information regarding whether a short defect occurs at a connection channel of which of the plurality of injectors, and the like.

For example, the register 230 may be configured to indicate a GND short in the bank 1 and a defect in an upper node bank 1_GND_Short_Top based on the injector. Further, the register 230 may be configured to indicate the GND short in the bank 1 and a defect in a left first channel bank 1_GND_Short_Bottom_Ch1 of a lower node based on the injector. The register 230 may also be configured to indicate the GND short in the bank 1 and a defect in a right second channel bank 1_GND_Short_Bottom_Ch2 of the lower node based on the injector. In addition, the register 230 may be configured to indicate a battery side short in the bank 1 and a defect in an upper node bank 1_VBattery_Short_Top based on the injector. The register 230 may be configured to indicate the battery side short in the bank 1 and a defect in a left first channel bank 1_VBattery_Short_Bottom_Ch1 of the lower node based on the injector. The register 230 may also be configured to indicate the battery side short in the bank 1 and a defect in a right second channel bank 1_VBattery_Short_Bottom_Ch2 of the lower node based on the injector.

The interface unit 240 may be configured to enable an interrupt pin to output a problem occurrence result received from the register 230 of the driving semiconductor 200 to the external main MCU 300. In other words, the interface unit 240 may be configured to read data stored in the register 230 and execute communication between the external main MCU 300 and serial peripheral interface (SPI). Further, the controller 270 may be configured to operate the first monitoring unit 210, the second monitoring unit 220, the register 230, the interface unit 240, and the driving units 250 and 260.

In this configuration, the controller 270 may be configured opt read the information stored in the register 230 to determine in which bank 100 the defect occurs. The controller 270 may be a control logic terminal of the driving semiconductor 200. The controller 270 may be configured to operate the driving semiconductor 200 to transfer a specific sequence to the driving units 250 and 260, to actively detect the defect locations of the bank 100 without operating the main MCU 300. In other words, the controller 270 may be configured to generate the specific sequence to more accurately determine at which location of the corresponding bank 100 the defect occurs to operate the driving units 250 and 260, to selectively operate the plurality of driving switches SW1 to SW4.

Additionally, the MCU 300 may be configured to receive an interface signal from the interface unit of the driving semiconductor 200 and generate a control pulse which operates the injectors 110 and 120. The MCU 300 may be configured to transfer an injector operation stop signal to the interface unit 240 of the driving semiconductor 200 when the short occurs in the bank 100. Further, the MCU 300 may be configured to access the register 230, in which the defect location information may be stored, through the interface unit 240 to detect the defect location. The interface unit 240 of the MCU 300 and the driving semiconductor 200 may be configured of the single in-line package (SIP) pin which performs communication with the interrupt pin for transmitting and receiving data.

The drivers 250 and 260 may be configured to selectively drive the driving switches SW1 to SW4 of the injectors 110 and 120 of the bank 100 based on the control of the driving semiconductor 200. The driving unit 250 may include the drivers D1 and D2 that drive the driving switches SW1 and SW2 at the power supply voltage side of the bank 100. Further, the driving unit 260 may include the drivers D3 and D4 that drive the driving switches SW3 and SW4 at the reference voltage side of the bank 100.

First, the driver D1 may be connected to a gate terminal of the driving switch SW1 to turn the driving switch SW1 on and off. The driving switch SW1 may be switched based on the output of the driver D1 to selectively supply the high voltage HV to the node ND1. The driving switch SW1 may remain in an off state during an idle mode. The driver D2 may be connected to the gate terminal of the driving switch SW2 to turn the driving switch SW2 on and off. The driving switch SW2 may be switched based on the output of the driver D2 to selectively supply the power supply voltage VBAT to the node ND1. The driving switch SW2 may remain in an off state during the idle mode. Further, the driver D3 may be connected to the gate terminal of the driving switch SW3 to turn the driving switch SW3 on and off. The driving switch SW3 may be switched based on the output of the driver D3 to selectively supply the reference voltage of the node ND2 to the node Node1. The driving switch SW3 may remain in an off state during the idle mode. The driver D4 may be connected to the gate terminal of the driving switch SW4 to turn the driving switch SW4 on and off. The driving switch SW4 may be switched based on the output of the driver D4 to selectively supply the reference voltage of the node ND2 to the node Node2. The driving switch SW4 may remain in an off state during the idle mode.

Figure 2:
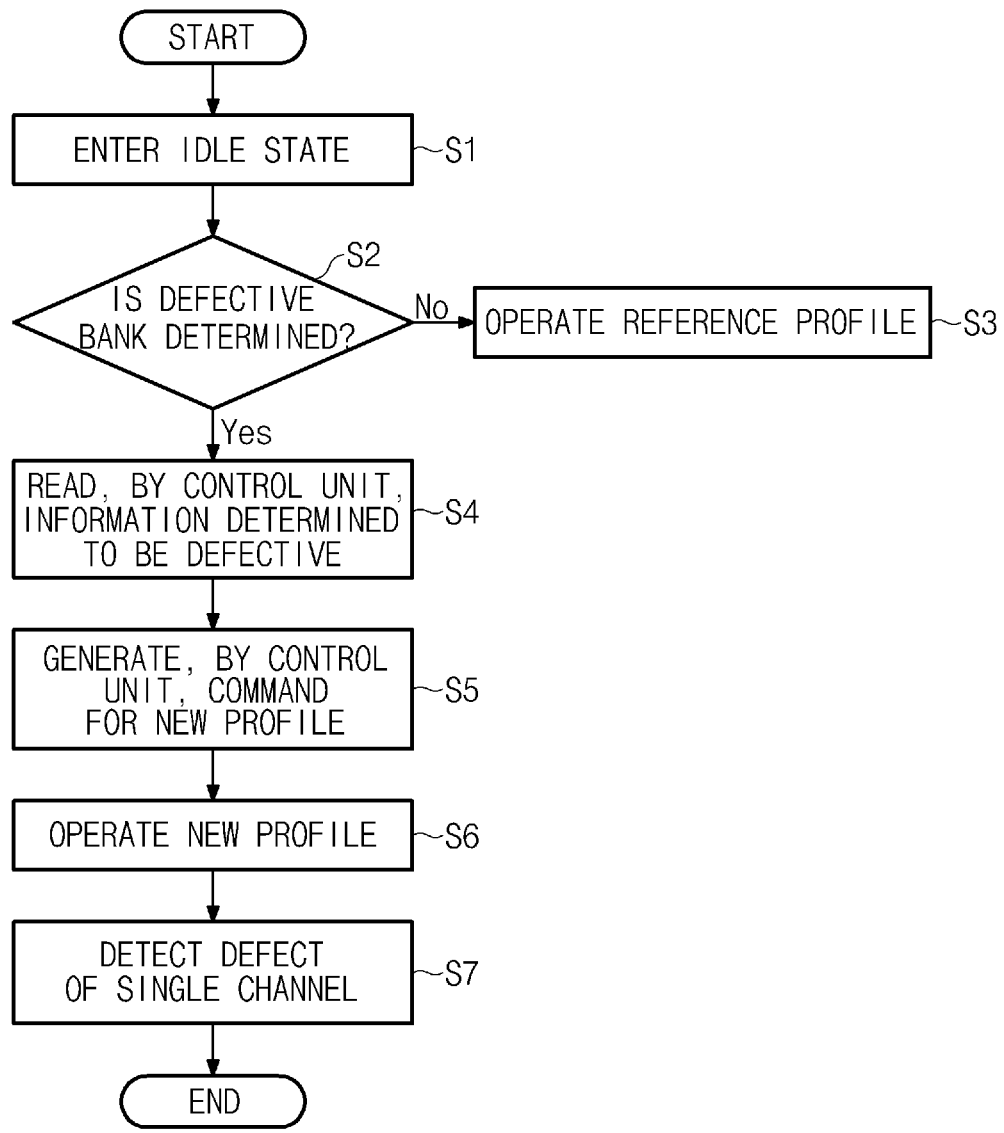
FIG. 2 is an exemplary operation flow chart of a driving semiconductor of FIG. 1 according to an exemplary embodiment of the present invention.

An operation process of the injector driver having the above configuration according to the exemplary embodiment of the present invention will be described with reference to FIG. 2. First, whether the driving semiconductor 200 enters the idle state may be determined (step S1). In response to determining that the driving semiconductor 200 enters the idle mode, the defective bank may be determined and analyzed (step S2). In response to determining that the corresponding bank is not defective, the bank may be operated as a profile which may be a reference (step S3). On the other hand, in response to determining that the corresponding bank is defective, the controller 270 may be configured to read the information determined as a defect from the register 230 (step S4). For example, the controller 270 may be configured to identify whether the battery side location of the bank 100 is defective or the reference voltage side location of the bank 100 is defective.

Next, the controller 270 may be configured to generate a command to perform a new profile (step S5) and may be operated based on a new profile (step S6). In other words, to identify the more accurate location at which the defect occurs in the bank 100, the driving semiconductor 200 may be configured to autonomously perform the specific sequence to operate the driving units 250 and 260. Further, the driving semiconductor 200 may be configured to monitor the driving switches SW1 to SW4 of the bank 100 to detect the defect of a single channel (step S7).

When the ground GND short occurs during the idle mode state in which the driving switches SW1 to SW4 of the bank 100 are turned off, the external nodes connected to the driving semiconductor 200 may have a ground GND voltage. Therefore, it may be difficult to identify at which node of the bank 100 the ground GND short occurs. Therefore, according to the exemplary embodiment of the present invention, the specific sequence may be performed by measuring the node voltage of both terminals of the plurality of driving switches SW1 to SW4 at the driving semiconductor 200 side. Further, the safety inspection result that the short defect occurs may be differentiated in the channel unit and stored in the internal register 230.

When abnormality (e.g., failure) occurs in the output channels of the driving switches SW1 and SW2 among the plurality of driving switches SW1 to SW4, a short may be detected at the power supply voltage side at the upper portions of the injectors 110 and 120. In addition, when abnormality occurs in the output channels of the driving switches SW3 and SW4 among the plurality of driving switches SW1 to SW4, a short may be detected at the reference voltage (e.g., ground voltage) side at the lower portions of the injectors 110 and 120.

According to the exemplary embodiment of the present invention, when the defect occurs in the bank 100, the defect may not be detected in the bank unit but may be detected in the channel unit to store the safety inspection result in the register 230. Further, when the safety inspection result is identified, the driving semiconductor 200 may be configured to store the location information of the defective short in the register 230 and continuously update the stored result. In particular, according to the exemplary embodiment of the present invention, the determination of the defect in the channel unit may be performed by the driving semiconductor 200 instead of the external MCU 300. Therefore, a user may read the information stored in the register 230 of the driving semiconductor 200 to more accurately detect the location at which the defect occurs.

Figure 3:
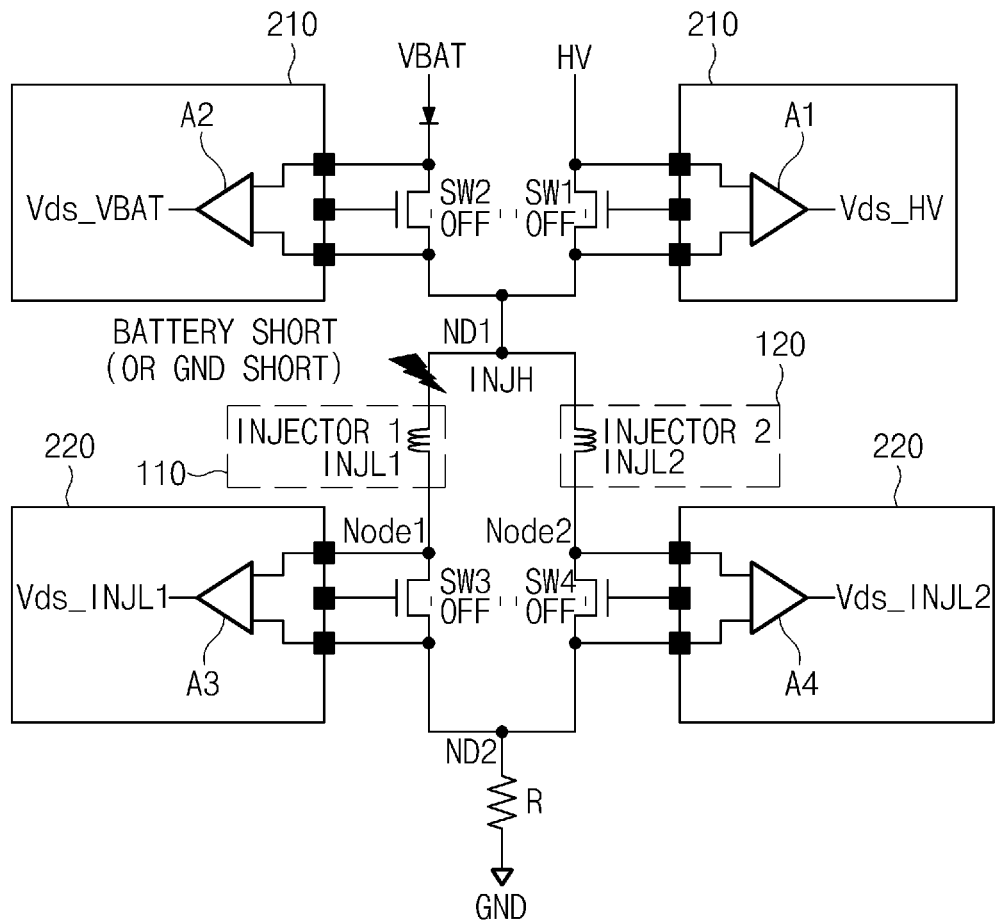
FIGS. 3 to 8 are exemplary diagrams for describing operations of a first monitoring unit and a second monitoring unit in the driving semiconductor of FIG. 1 in an idle mode according to an exemplary embodiment of the present invention.
Figure 4:
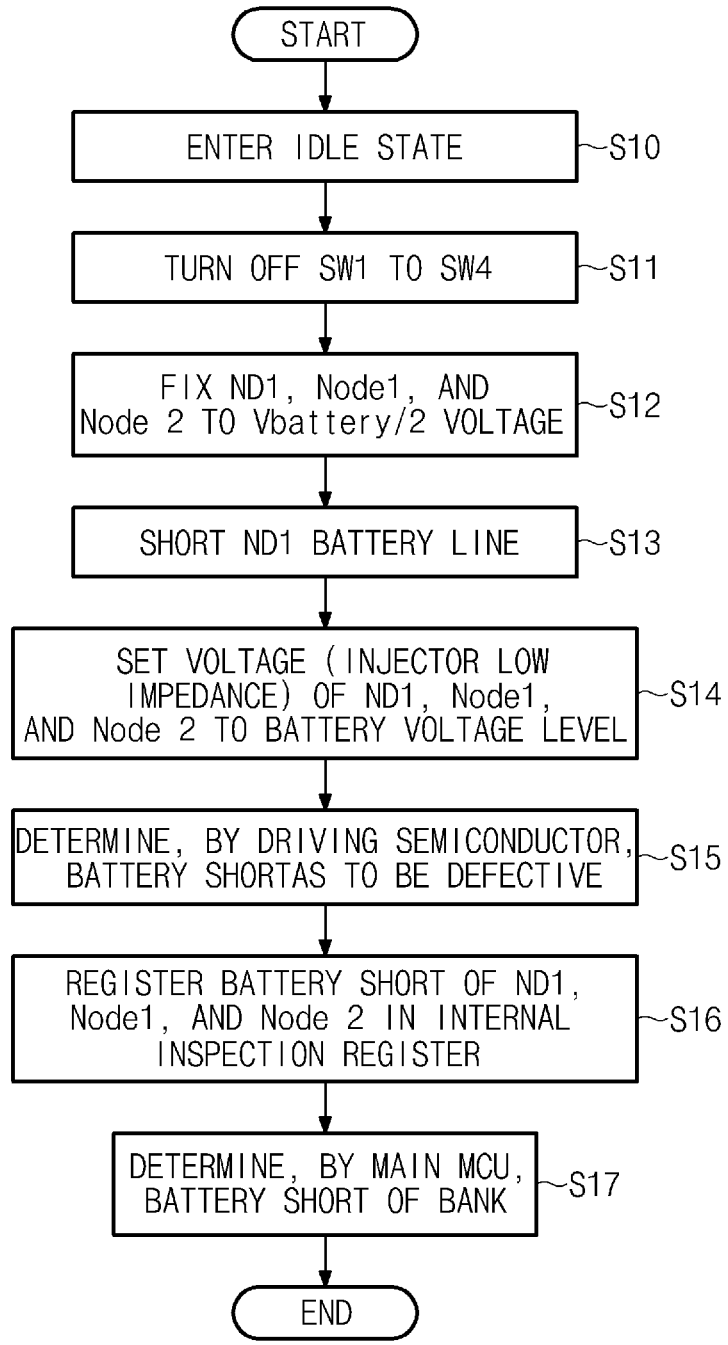

FIGS. 3 to 8 are exemplary diagrams for describing the operations of the first monitoring unit 210 and the second monitoring unit 220 in the driving semiconductor 200 of FIG. 1 during an idle mode. First, FIGS. 3 and 4 illustrate an exemplary configuration and method for inspecting the occurrence of the short defect of the bank 100.

During the idle mode state (step S10), the driving switches SW1 to SW4 connected to the injectors 110 and 120 may remain in an off state (step S11). The nodes ND1, Node1, and Node2 may maintain a fixed state as a battery voltage VBATT/2 (step S12). When the battery short (or, ground GND short) occurs in a connection line between the injectors 110 and 120 and a control board, a voltage value may be about a reference voltage may be detected in the driving semiconductor 200 (step S13). In particular, when the injectors 110 and 120 have a substantially low impedance, the driving semiconductor 200 may be configured to sense a battery voltage level with voltage levels of the nodes ND1, Node1, and Node2 (step S14). The driving semiconductor 200 may be configured to determine the battery short of the bank 100 to be defective (step S15) and register the battery short in the internal register 230 (step S16). Further, the MCU 300 may be configured to read the data stored in the register 230 via the interface unit 240 to identify whether the battery short of the bank 100 occurs in the bank unit (step S17).

According to the exemplary embodiment of the present invention, a portion at which the driving semiconductor 200 inspects the bank 100 to detect the location of the short defect may correspond to three portions ND1, Node1, and Node 2. However, since the driving semiconductor 200 may be configured to sense the short defect in the bank unit, the above method may not accurately determine the location of the short defect. In other words, when any one of the nodes ND1, Node1, and Node2 has a short defect during the idle mode, the voltage of the three nodes ND1, Node1, and Node2 may be the short voltage and thus may have about the same potential value.

Therefore, the nodes ND1, Node1, and Node2 may be indicated as a short to battery (or, short to ground) state. In other words, it may be difficult to differentiate whether a high side short defect of the node ND1 or a low side short defect of the nodes Node1 and Node2 occurs. In particular, even in the low side line, it may be difficult to accurately determine whether the node Node1 side short defect or the node Node2 side short defect occurs. Accordingly, when the short defect occurs during the idle mode, the register 230 may store only two types of short states such as "short to battery" and "short to ground." Therefore, according to the exemplary embodiment of the present invention, the short defect of the bank 100 may be determined in the channel unit.

Figure 5:
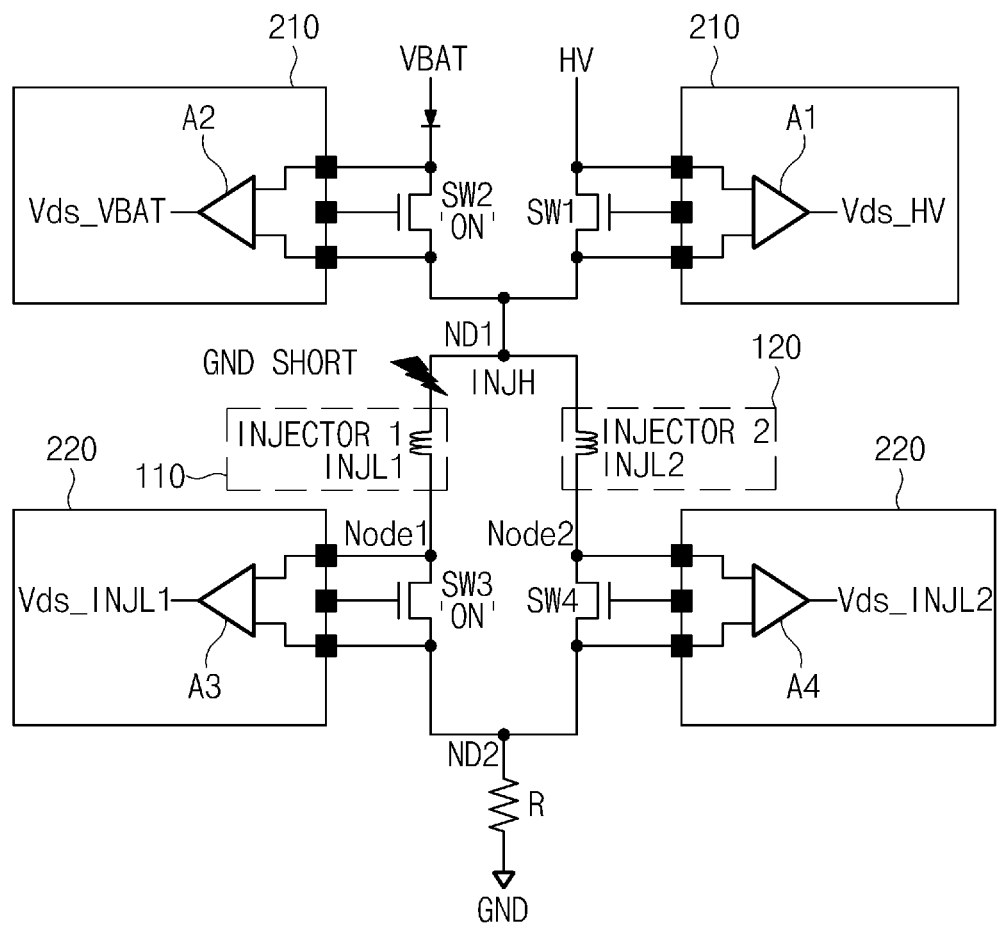
Figure 6:
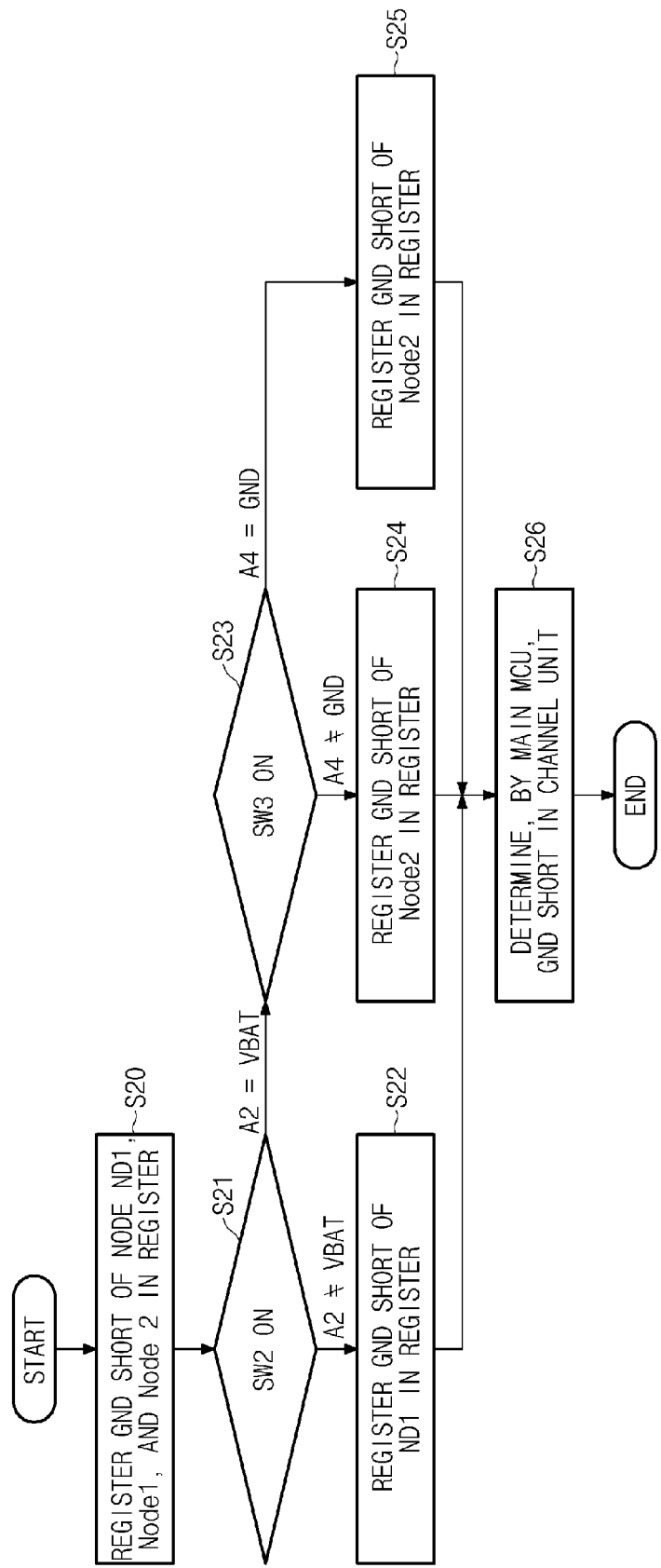

Moreover, FIGS. 5 and 6 illustrate an exemplary configuration to inspect the defect occurrence of the ground GND short during the idle mode. The driving switches SW1 to SW4 connected to the injectors 110 and 120 may remain in an off state during the idle mode state. The nodes ND1, Node1, and Node 2 may remain in the fixed state as the battery voltage VBATT/2. When the ground GND short occurs in the connection line between the injectors 110 and 120 and the control board, the voltage value which may be equal to or less than the reference voltage may be detected in the driving semiconductor 200. In particular, when the injectors 110 and 120 have the substantially low impedance, the driving semiconductor 200 may be configured to sense the ground voltage level with the voltage levels of the nodes ND1, Node1, and Node2. The driving semiconductor 200 may determine the ground short and may be configured to register the ground short in the internal register 230 (step S20).

According to the exemplary embodiment of the present invention, when the information regarding in which bank 100 the short defect occurs is sensed, the driving semiconductor 200 may be configured to perform sequence stored in the controller 270 to determine whether the power supply voltage side short defect or the reference voltage side short defect is a short in the channel unit. In other words, the driving semiconductor 200 may be configured to operate the driving units 250 and 260 as the specific sequence for a predefined minimum time to detect the defect and then enter the idle state again.

Accordingly, the controller 270 may be configured to operate the driving unit 250 to turn on the driving switch SW2 connected to the power supply voltage VBAT applying terminal (step S21). Therefore, it may be possible to detect whether the short defect at the battery side location or the short defect of the reference voltage side location occurs by the comparison operation of the comparator A2. In other words, an injector output voltage of the node ND1 may be assumed to be INJH and the output signal of the comparator A2 may be assumed to be Vds_VBAT. The comparator A2 may be configured to compare the voltage INJH with the power supply voltage VBAT to output the output signal Vds_VBAT.

A voltage applied to one terminal of the comparator A2 may correspond to the voltage VBAT-Vthr to be less than the power supply voltage VBAT by a threshold voltage Vthr. Herein, the threshold voltage Vthr may be the threshold voltage value applied to the power supply voltage terminal as a load during the idle mode. In particular, a predetermined voltage may be applied to the injector 110 to generate a reference value in a normal state (e.g., a state without error, failure, short, etc.). Herein, a predetermined voltage may be applied as about half of the value of the power supply voltage VBAT. Therefore, when the voltage INJH is greater than the voltage VBAT-Vthr, the comparator A2 may be configured to output the output signal Vds_VBAT as the logic "0." On the other hand, when the voltage INJH is less than the voltage VBAT-Vthr, the comparator A2 may be configured to output the output signal Vds_VBAT as the logic "1."

Further, the output signal Vds_VBAT output to the comparator A2 may be stored in the register 230. In other words, when the output signal Vds_VBAT of the comparator A2 is not the battery voltage VBAT level, the ground short of the node ND1 may be registered in the register 230 (step S22). In response to determining that the power supply voltage side short defect does not occur, whether the reference voltage side short defect occurs may be determined. In addition, whether short of the injector 110 node or the short of the injector 120 node occurs at the reference voltage side may be determined. In other words, in response to determining that the reference voltage side short defect occurs, whether the short defect occurs in any of the nodes Node1 and Node2 may be determined.

Therefore, the output signal Vds_VBAT of the comparator A2 is the battery voltage VBAT level, the driving switch SW3 connected between the reference voltage applying terminal and the node Node1 may be turned on (step S23). Next, the short defect of the reference voltage side location may be detected by the comparison operation of the comparator A4. When the short occurs between the reference voltage applying terminal and the node Node2, the short defect of the right lower channel may be detected by the comparison operation of the comparator A4. In other words, the injector 120 voltage of the node Node2 may be assumed to be the INJL2 and the output signal of the comparator A4 may be assumed to be the Vds_INJL2. Next, the comparator A4 may be configured to compare the voltage INJL2 with the output voltage of the node ND2 to output the output signal Vds_INJL2.

In particular, the voltage applied to one terminal of the comparator A4 may correspond to the voltage GND+Vthr to be greater than the ground voltage GND by the threshold voltage Vthr. Herein, the threshold voltage Vthr may be the threshold voltage value applied to the ground voltage terminal as a load during the idle mode. In particular, a predetermined voltage may be applied to the injector 120 to generate a reference value in a normal state. Herein, a predetermined voltage may be applied as about half of the value of the power supply voltage VBAT. Therefore, when the voltage INJL2 is less than the voltage GND+Vthr, the comparator A4 may be configured to output the output signal Vds_INJL2 as the logic "0." On the other hand, when the voltage INJL2 is greater than the voltage GND+Vthr, the comparator A4 may be configured to output the output signal Vds_INJL2 as the logic "1."

Further, the output signal Vds_INJL2 output to the comparator A4 may be stored in the register 230. In other words, when the output signal Vds_INJL2 of the comparator A4 is not the ground GND level, the ground short of the node Node2 may be registered in the register 230 (step S24). On the other hand, when the output signal Vds_INJL2 of the comparator A4 is the ground GND level, the ground short of the node Node1 may be registered in the register 230 (step S25). Additionally, the MCU 300 may be configured to read the data stored in the register 230 via the interface unit 240 to identify whether the ground GND short of the bank 100 occurs in the channel unit (step S26).

Figure 7:
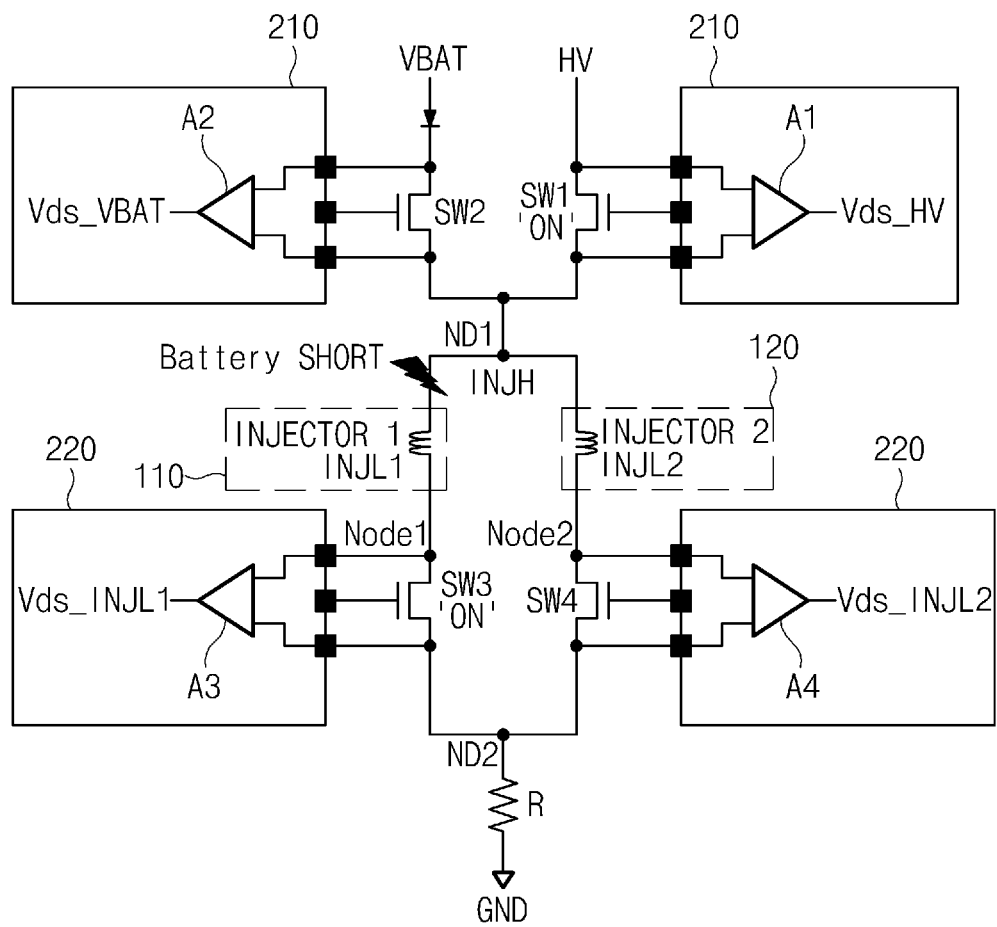
Figure 8:
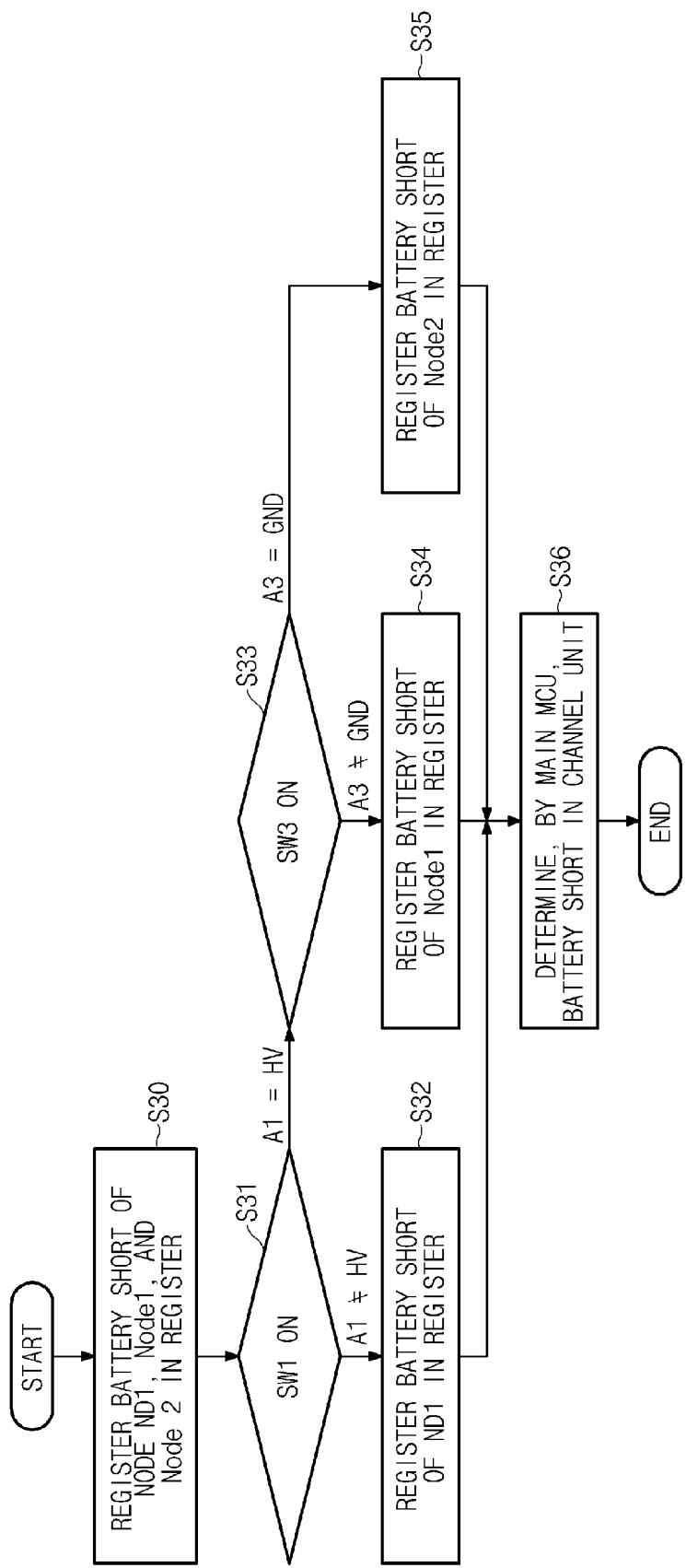

Moreover, FIGS. 7 and 8 illustrate an exemplary configuration to inspect the defect occurrence of the battery short during the idle mode. The driving switches SW1 to SW4 connected to the injectors 110 and 120 may remain in an off state during the idle mode state. The nodes ND1, Node1, and Node 2 may remain in a fixed state as the battery voltage VBATT/2. When the battery short occurs in the connection line between the injectors 110 and 120 and the control board, the voltage value which may be equal to or greater than the reference voltage may be detected in the driving semiconductor 200. In particular, the driving semiconductor 200 may be configured to sense the battery voltage level with the voltage level of the nodes ND1, Node1, and Node2. The driving semiconductor 200 may be configured to determine the battery short and register the battery short in the internal register 230 (step S30).

According to the exemplary embodiment of the present invention, when the information regarding in which bank 100 the short defect occurs is sensed, the driving semiconductor 200 may be configured to perform sequence stored in the controller 270 to determine whether the power supply voltage side short defect or the reference voltage side short defect is a short in the channel unit. The controller 270 may be configured to operate the driving unit 250 to turn on the driving switch SW1 connected to the high voltage HV applying terminal (step S31). Therefore, it may be possible to detect whether the short defect at the battery side location or the short defect of the reference voltage side location occurs by the comparison operation of the comparator A1. In other words, the injector output voltage of the node ND1 may be assumed to be the INJH and the output signal of the comparator A1 may be assumed to be the Vds_HV. Next, the comparator A1 may be configured to compare the voltage INJH with the high voltage HV to output the output signal Vds_HV.

In particular, the voltage applied to one terminal of the comparator A1 may correspond to the voltage HV-Vthr to be less than the substantially high voltage HV by the threshold voltage Vthr. Herein, the threshold voltage Vthr may be the threshold voltage value applied to the high voltage terminal as a load during the idle mode. A predetermined voltage may be applied to the injector 120 to generate a reference value in a normal state. In addition, a predetermined voltage may be applied as about half of the value of the power supply voltage VBAT. Therefore, when the voltage INJH is greater than the voltage HV-Vthr, the comparator A1 may be configured to output the output signal Vds_HV as the logic "0." When the voltage INJH is less than the voltage HV-Vthr, the comparator A1 may be configured to output the output signal Vds_HV as the logic "1." Further, the output signal Vds_HV output to the comparator A1 may be stored in the register 230. In other words, when the output signal Vds_HV of the comparator A1 is not the substantially high voltage HV level (e.g., is less than a predetermined voltage level), the battery short of the node ND1 may be registered in the register 230 (step S32).

Meanwhile, in response to determining that the power supply voltage side short defect does not occur, whether the reference voltage side short defect occurs may be determined. Further, whether the short of the injector 110 node or the short of the injector 120 node occurs at the reference voltage side may be determined. In other words, in response to determining that the reference voltage side short defect occurs, whether the short defect occurs in any of the nodes Node1 and Node2 may be determined Therefore, the output signal Vds_HV of the comparator A1 may be the substantially high voltage HV level (e.g., a voltage level greater than a predetermined voltage), the driving switch SW3 connected between the reference voltage applying terminal and the node Node1 may be turned on (step S33). Next, the short defect of the reference voltage side location may be detected by the comparison operation of the comparator A3.

When the short occurs between the reference voltage applying terminal and the node Node2, the short defect of the left lower channel may be detected by the comparison operation of the comparator A3. In other words, the injector 120 voltage of the node Node1 may be assumed to be the INJL1 and the output signal of the comparator A3 may be assumed to be the Vds_INJL1. Next, the comparator A3 may be configured to compare the voltage INJL1 with the output voltage of the node ND2 to output the output signal Vds_INJL1. In particular, the voltage applied to one terminal of the comparator A3 may correspond to the voltage GND+Vthr to be greater than the ground voltage GND by the threshold voltage Vthr. Herein, the threshold voltage Vthr may be the threshold voltage value applied to the ground voltage terminal as a load during the idle mode. In particular, a predetermined voltage may be applied to the injector 110 to generate a reference value in a normal state. Herein, a predetermined voltage may be applied as about half of the value of the power supply voltage VBAT.

Therefore, when the voltage INJL1 is less than the voltage GND+Vthr, the comparator A3 may be configured to output the output signal Vds_INJL1 as the logic "0." When the voltage INJL1 is greater than the voltage GND+Vthr, the comparator A3 may be configured to output the output signal Vds_INJL1 as the logic "1." Further, the output signal Vds_INJL1 output to the comparator A3 may be stored in the register 230. In other words, when the output signal Vds_INJL1 of the comparator A3 is not the ground GND level, the battery short of the node Node1 may be registered in the register 230 (step S34). When the output signal Vds_INJL1 of the comparator A3 is the ground GND level, the battery short of the node Node2 may be registered in the register 230 (step S35).

Further, the MCU 300 may be configured to read the data stored in the register 230 via the interface unit 240 to identify whether the battery short of the bank 100 occurs in the channel unit (step S36). When the safety inspection result for each channel stored in the register 230 indicates the logic "0," the controller 270 of the driving semiconductor 200 may be configured to determine that the defect occurs in the corresponding channel of the bank 100. For example, when the output signal Vds_HV output from the comparator A1 of the upper first monitoring unit 210 is the logic "0," the controller 270 may be configured to determine that the short occurs in the channel connected to the driving switch SW1.

When the output signal Vds_VBAT output from the comparator A2 of the upper first monitoring unit 210 is the logic "0," the controller 270 may be configured to determine that the short occurs in the channel connected to the driving switch SW2. When the output signal Vds_INJL1 output from the comparator A3 of the lower second monitoring unit 220 is the logic "0," the controller 270 may be configured to determine that the short occurs in the channel connected to the driving switch SW3. In other words, the controller 270 may be configured to determine that the short occurs at the lower location of the injector 110.

Additionally, when the output signal Vds_INJL2 output from the comparator A4 of the lower second monitoring unit 220 is the logic "0," the controller 270 may be configured to determine that the short occurs in the channel connected to the driving switch SW4. In other words, the controller 270 may be configured to determine that the short occurs at the lower location of the injector 120. When the short of the bank 100 detected in the driving semiconductor 200 is the "short to battery," the controller may be configured to determine as the node ND1 battery short (e.g., short to battery_ND1), the node Node1 battery short (e.g., short to battery_Node1), the node Node2 battery short (e.g., short to battery_Node2). Further, when the short of the bank 100 detected in the driving semiconductor 200 is the "short to ground," the controller 270 may be configured to determine as the node ND1 ground short (e.g., short to ground_ND1), the node Node1 ground short (e.g., short to ground_Node1), the node Node2 ground short (e.g., short to ground_Node2). Therefore, the external main MCU 300 may be configured to read the data stored in the register 230 via the interface unit 240 to identify the more accurate short location of the bank 100 in the channel unit.

According to the exemplary embodiments of the present invention, it may be possible to actively identify the defect of the driving channel by enabling the identification of safety inspection for each driving channel in the driving semiconductor during the idle mode. The exemplary embodiments of the present invention described above have been provided for illustrative purposes. Therefore, those skilled in the art will appreciate that various modifications, alterations, substitutions, and additions are possible without departing from the scope and spirit of the invention as disclosed in the accompanying claims and such modifications, alterations, substitutions, and additions fall within the scope of the present invention.

What is claimed is:

1. An injector driver, comprising:
a plurality of driving switches configured to operate an injector; and
a driving semiconductor configured to:
drive the driving switches;
determine a short defect of the injector during an idle mode; and
detect and store the defective short in a channel unit,
wherein the driving semiconductor includes a controller configured to:
monitor a connection node short between the driving switches and the injector;
store the monitored connection node short in a register; and
read information stored in the register to determine a short defect location of the injector.

2. The injector driver according to claim 1, wherein the controller is further configured to:
read the information stored in the register and transmit the read information to an external micro control unit.

3. The injector driver according to claim 1, wherein the driving semiconductor further includes:
a driving unit configured to selectively operate the driving switches.

4. The injector driver according to claim 3, wherein the controller is configured to operate the driving unit to selectively turn on the driving switches.

5. The injector driver according to claim 1, wherein the controller is further configured to:
detect a short between the driving switches located at a power supply voltage side among the driving switches and the injector; and
detect a short between the driving switches located at a reference voltage side among the driving switches and the injector.

6. The injector driver according to claim 5, wherein the controller is further configured to:
compare an output voltage between a high voltage applying terminal and the injector; and
compare an output voltage between a power supply voltage applying terminal and the injector.

7. The injector driver according to claim 5, wherein the controller is further configured to:
compare an output voltage between a ground voltage terminal and a first injector; and
compare an output voltage between the ground voltage terminal and a second injector.

8. An injector driver, comprising:
a plurality of driving switches configured to operate an injector; and
a controller having configured to
drive the driving switches;
determine a short defect of the injector during an idle mode;
detect the defective short in a channel unit;
store the detected defective short in a register;
read information stored in the register to determine a short defect location of the injector;
detect a short between the driving switches located at a power supply voltage side among the driving switches and the injector; and detect a short between the driving switches located at a reference voltage side among the driving switches and the injector.

9. The injector driver according to claim 8, wherein the controller is further configured to:
read the information stored in the register; and
transmit the read information to an external micro control unit.

10. The injector driver according to claim 8, further comprising:
a driving unit configured to selectively operate the driving switches.

11. The injector driver of claim 10, wherein the controller is configured to operate the driving unit to selectively turn on the driving switches.

12. The injector driver according to claim 8, wherein the controller is further configured to:
compare an output voltage between a high voltage applying terminal and the injector; and
compare an output voltage between a power supply voltage applying terminal and the injector.

13. The injector driver according to claim 8, wherein the controller is further configured to:
compare an output voltage between a ground voltage terminal and a first injector; and
compare an output voltage between the ground voltage terminal and a second injector.

14. A method of controlling an injector driver, comprising:
driving, by a controller, a plurality of driving switches configured to operate an injector;
determining, by the controller, a short defect of the injector during an idle mode;
detecting, by the controller, the defective short in a channel unit;
storing, by the controller, the detected defective short in a register;
reading, by the controller, information stored in the register to determine a short defect location of the injector;
detecting, by the controller, a short between the driving switches located at a power supply voltage side among the driving switches and the injector; and
detecting, by the controller, a short between the driving switches located at a reference voltage side among the driving switches and the injector.

15. The method of claim 14, further comprising:
reading, by the controller, the information stored in the register; and
transmitting, by the controller, the read information to an external micro control unit.

* * * * *